(12) United States Patent
Melnik et al.

(10) Patent No.: US 6,545,731 B2
(45) Date of Patent: Apr. 8, 2003

(54) LIQUID CRYSTAL DISPLAY DEVICE HAVING LIGHT ISOLATION STRUCTURE

(75) Inventors: George A. Melnik, Montrose, NY (US); Lucian R. Albu, New York, NY (US); Peter J. Janssen, Scarborough, NY (US); Stefan Hausser, Ludwigsburg (DE); Joerg Spengler, Sindelfingen (DE); Karl-Heinz Kraft, Stuttgart (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 28 days.

(21) Appl. No.: 09/833,765

(22) Filed: Apr. 13, 2001

(65) Prior Publication Data

US 2002/0149718 A1 Oct. 17, 2002

(51) Int. Cl.[7] .................. G02F 1/136; G02F 1/1333
(52) U.S. Cl. .................. 349/44; 349/110; 349/111; 349/151; 349/152
(58) Field of Search .................. 349/110, 111, 349/156, 44, 151, 152

(56) References Cited

U.S. PATENT DOCUMENTS

| 5,410,344 A | 4/1995 | Graves et al. .......... 348/1 |
| 6,005,597 A | 12/1999 | Barrett et al. .......... 348/1 |
| 6,081,305 A | 6/2000 | Sato et al. .......... 349/5 |

FOREIGN PATENT DOCUMENTS

| WO | WO9837696 | 8/1998 | .......... H04N/7/173 |

OTHER PUBLICATIONS

Smyth et al., "Surfing The Digital Wave Generating Personalised TV Listings Using Collaborative, Case–Basedrecommendation, " Case–Based Reasoning Research And Development. International Conference, XX, XX, Jul. 1999, pp. 561–571.

Primary Examiner—Robert H. Kim
Assistant Examiner—Hoan Nguyen

(57) ABSTRACT

A reflective liquid crystal display (LCD) device includes a wall substantially extending between a peripheral portion of a first metal layer (pixel metal layer) formed in the peripheral region of the device with a light shield portion of a second metal layer formed in the pixel region of the device. The structure prevents light from reaching the substrate in the peripheral region of the device. Portions of the second metal layer formed in the peripheral region of the device may therefore be used for signal routing.

23 Claims, 2 Drawing Sheets

LIQUID CRYSTAL DISPLAY DEVICE HAVING LIGHT ISOLATION STRUCTURE

FIELD OF TECHNOLOGY

This invention pertains to the field of liquid crystal display (LCD) devices, such as liquid crystal on silicon (LCOS) devices, and more particularly to light shielding in such devices.

BACKGROUND AND SUMMARY

Reflective LCD devices are well known. Examples of such devices, and in particular active matrix devices, are shown in U.S. Pat. Nos. 6,023,309 and 6,052,165. With reference to the following description, familiarity with conventional features of such devices will be assumed, so that only features bearing on the present invention will be described.

FIG. 1 shows a portion of typical prior-art reflective LCD device 100. The reflective LCD device 100 may generally be divided into a pixel region 100a (active region) and a peripheral region 100b. The pixel region 100a includes an array of pixel elements and the peripheral region 100b includes driver circuits 105 for supplying driving signals to each of the pixel elements.

The LCD device 100 comprises, in relevant part, a silicon substrate 110, an insulating layer 112, a liquid crystal layer 114, a transparent electrode 116, such as indium-tin-oxide (ITO), and a glass layer 118. A reflective mirror (pixel) metal layer 120 is provided beneath the liquid crystal layer 114 on the insulating layer 112. The mirror metal layer 120 includes a plurality of individual reflective pixel electrodes 120a in the pixel region 100a, with light transmissive regions 122 being located between the pixel electrodes 120a.

Also provided in the insulating layer 112 and between the mirror metal layer 120 and the substrate 110 are at least three metal layers 124, 128 and 130. In the pixel region 100a, the metal layers 128 and 130 form mutually-orthogonal row and column lines, which may be connected to gate and source electrodes of MOS transistors (not shown in FIG. 1) for pixel elements fabricated in the underlying substrate 110. In the peripheral region 100b, the metal layers 128 and 130 form signal routing lines used for routing various signals of the driver circuits 105. Also, metal plugs or vias 132 are provided for connecting various portions of first, second, third and fourth metal layers 120, 124, 128, 130 with each other.

In addition, the metal layer 124 is provided to prevent light entering the device, such as through the transmissive regions 122 between the pixel electrodes 120a, from reaching the substrate 110 where it might induce leakage currents or otherwise interfere with proper device operation. Note that while portions of metal layers 128 or 130 may incidentally block a small portion of light entering the device, the structure of FIG. 1 requires a separate metal layer 124 to be dedicated to provide the required degree of light blocking in the peripheral region 100b. This is due to the fact that light trapped between the two metal layers 120 and 124 can propagate over long distances due to multiple reflections between the layers.

While this prior-art solution is satisfactory for blocking light from reaching the substrate 110 in the peripheral region 100b, it requires the additional dedicated metal layer 124 in the peripheral region 100b. However, the area required for the driver circuits 105 could be reduced if the metal layer 124 could also be used for routing driver circuitry signals in the peripheral region 100b, instead of being dedicated only to light blocking.

Accordingly, it would be desirable to accomplish the light-blocking function of the dedicated metal layer in the peripheral region of the prior art devices without using a separate dedicated metal layer in this region. Other and further objects and advantages will appear hereinafter.

Therefore, in one aspect, the invention provides a liquid crystal display (LCD) which blocks light in the peripheral driver circuit region of the device without providing a dedicated metal layer in this region for this purpose.

Accordingly, an LCD device is provided having a pixel region and a peripheral region adjacent to the pixel region, comprising a substrate, a first metal layer above the substrate including an array of pixel electrodes in the pixel region and a peripheral portion in the peripheral region, a second metal layer beneath the array of pixel electrodes, and a wall disposed between the second and first metal layers along an edge of the pixel region and extending upward to the peripheral portion of the first metal layer.

DETAILED DESCRIPTION

Figure 1:
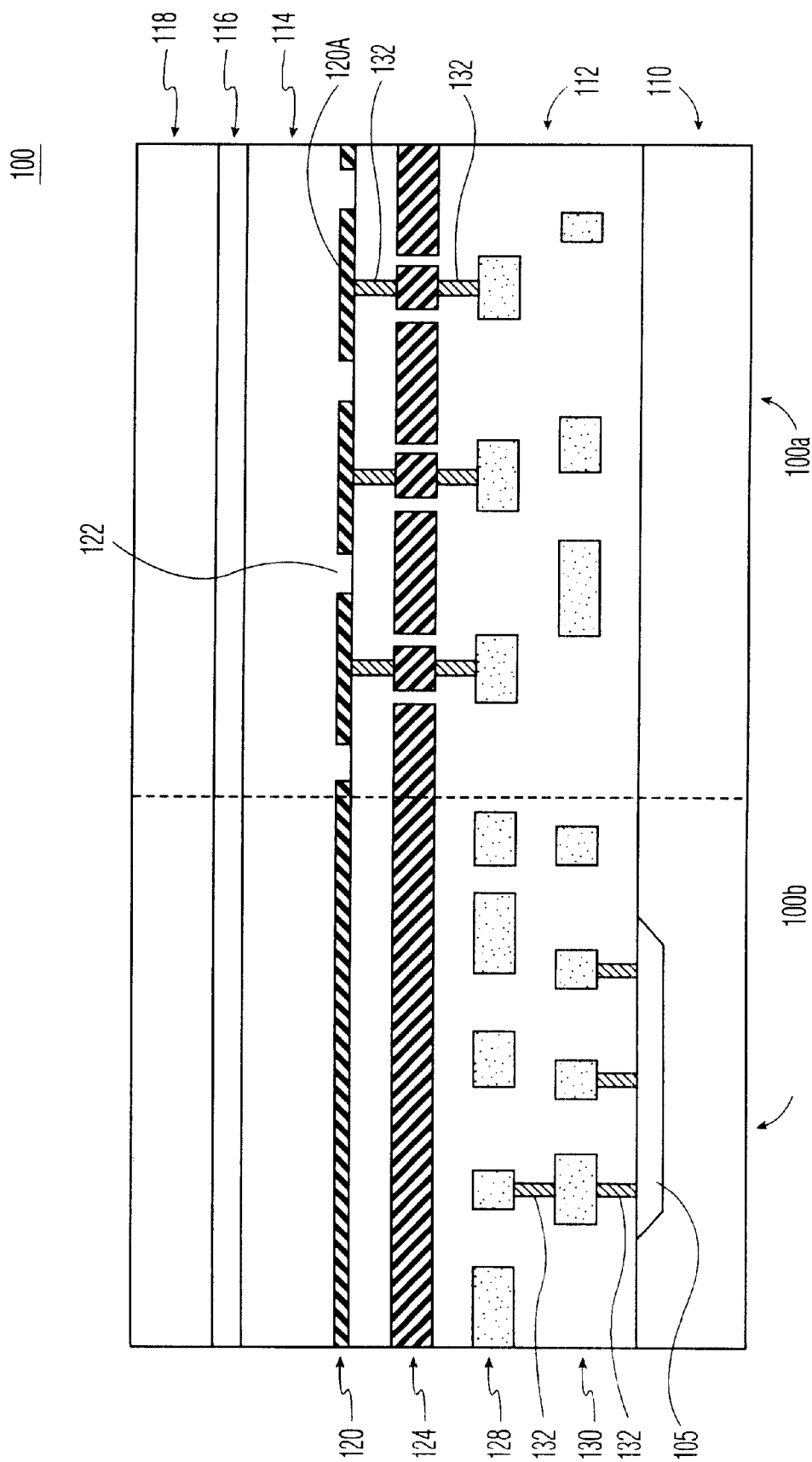
FIG. 1 shows a simplified cross-sectional view of a portion of a prior-art liquid crystal display (LCD) device having a separate dedicated light blocking layer in the peripheral region.
Figure 2:
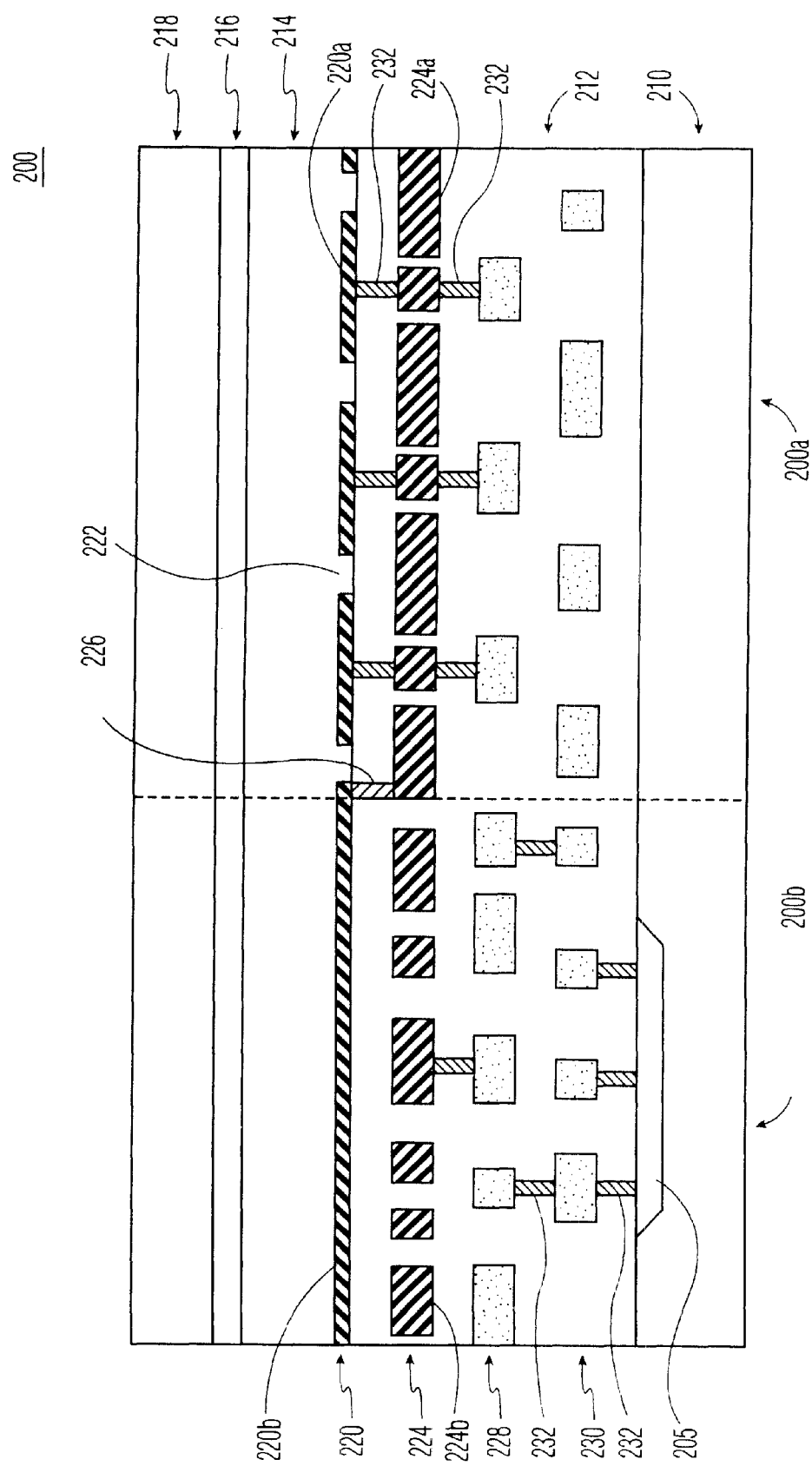
FIG. 2 shows a simplified cross-sectional view of a portion of one embodiment of an LCD device having a light-blocking structure in accordance with one or more aspects of the invention.

FIG. 2 shows a simplified cross-sectional view of a portion of a reflective LCD device 200 in accordance with one or more aspects of the invention. For clarity and simplicity, those portions of the device relating to the present invention are illustrated. The reflective LCD device 200 may generally be divided into a pixel region 200a (active region) and a peripheral region 200b. The pixel region 200a includes an array of pixel elements, and the peripheral region 200b includes driver circuits 205 for supplying driving signals to each of the pixel elements.

The LCD device 200 comprises, in relevant part, a silicon substrate 210 on which are successively provided an insulating layer 212, a liquid crystal layer 214, a transparent electrode 216, such as indium-tin-oxide (ITO), and a glass layer 218. A first metal layer (pixel metal layer) 220 is provided on the insulating layer 212 beneath the liquid crystal layer 214. The first metal layer 220 includes a plurality of individual reflective pixel electrodes 220a formed in the pixel region 200a, and a peripheral portion 220b formed in the peripheral region 200b of the LCD device 200. Light transmissive regions 222 are located between the pixel electrodes 220a. Preferably, the peripheral portion 220b of the first metal layer 220 is substantially continuous in the peripheral region 200b.

Also, a second metal layer 224 is provided between the first metal layer 220 and the substrate 210. The second metal layer 224 includes a light shield portion 224a in the pixel region 200a, and signal routing lines 224b in the peripheral region 200b. A light-blocking partition or wall 226 is provided extending substantially between the light shield portion 224a of the second metal layer 224 and the peripheral portion 220b of the first metal layer 220. Beneficially, the wall 226 is provided on or near an edge of the light shield portion 224a, at a border between the pixel region 200a and the peripheral region 200b. Preferably, the wall 226 is continuously formed around the entire pixel region 200a. Also, preferably, the wall 226 extends vertically to connect the light shield portion 224a of the second metal layer 224 to the peripheral portion 220b of the first metal layer 220. Additionally, third and fourth metal layers 228 and 230 are provided between the second metal layer 224 and the substrate 210. Also, metal plugs or vias 132 are provided for connecting various portions of first, second, third and fourth metal layers 120, 124, 128, 130 with each other.

An operation of various pertinent elements of the embodiment will now be described.

In the pixel region 200a, the third and fourth metal layers 228 and 230 form mutually-orthogonal row and column lines which may be connected to gate and source electrodes of MOS transistors (not shown in FIG. 2) for each pixel element fabricated in the underlying substrate 210. In the peripheral region 200b, the third and fourth metal layers 228 and 230 are used for routing various signals of the driver circuits 205.

Beneficially, the first metal layer 220 is a mirror (pixel) metal layer, such that the peripheral portion 220b substantially blocks light that directly impinges on the peripheral region 200b from reaching the substrate 210 in the peripheral region 200b. Similarly, the light shield portion 224a of the second metal layer 224 operates together with the pixel electrodes 220a and the third metal layer 228 to substantially block light that directly impinges on the pixel region 200a from reaching the substrate 210 in the pixel region 200a.

Meanwhile, the wall 226 operates together with the light shield portion 224a of the second metal layer 224 and the peripheral portion 220b of the first metal layer 220 to form a light shield structure that substantially blocks light (such as light that might enter the pixel region 200a through the light transmissive regions 222) from being directed or reflected onto the substrate 210 in the peripheral region 200b of the device 200. Therefore, the portion of the second metal layer 224 in the peripheral region 200a does not need to be dedicated to blocking light and instead can be used to form signal routing lines 224b for routing signals of the driver circuits, together with the third and fourth metal layers 228 and 230. Accordingly, the area required for the driver circuitry, and therefore the total device size, may be reduced. In that case, more devices may be patterned on a wafer and the yield may be increased.

In one embodiment, the wall 226 has a height of approximately 1 μm so as to extend vertically between and connect the first metal layer 220 and the second metal layer 224. In that case, the thickness of the wall 226 may be approximately 0.6 μm.

In one preferred embodiment, the wall 226 is formed by patterning a vertically-extending hole in the insulating layer 212 and depositing a light-blocking material therein prior to depositing the first metal layer 220. Also, beneficially, the wall 226 may be formed of Tungsten. In this case, the light blocking wall 226 is formed of the same material as the vias 232 in the insulating layer 212, thus requiring no additional processing steps.

However, other light blocking materials and methods of fabrication may be used. In an alternative embodiment, an additional layer of opaque insulating material (e.g., TiN) is used to from the light blocking wall 226. In that case, a voltage potential or electrical signal present on the light shield portion 224a of the second metal layer 224 may be different from a voltage potential or electrical signal present on the peripheral portion 220b of the first metal layer 220. Thus, for example, when it is convenient to ground the light shield portion 224a of the second metal layer 224, the peripheral portion 220b of the first metal layer 220 may be isolated from ground to prevent an undesirable electrical short from occurring.

While the present invention has been particularly shown and described with reference to the preferred embodiments thereof, it will be understood by those skilled in the art that various changes in detail may be made without departing from the scope of the invention as defined by the claims.

What is claimed is:

1. A liquid crystal display (LCD) device having a pixel region and a peripheral region adjacent to the pixel region, comprising:
   a silicon substrate;
   a first metal layer above the substrate, and comprising
      an array of pixel electrodes in the pixel region, and
      a peripheral portion in the peripheral region;
   a second metal layer between the first metal layer and the substrate, comprising,
      a light shield portion in the pixel region, and
      a plurality of signal routing lines in the peripheral region; and
   a wall on the light shield portion of the second metal layer and extending substantially to the peripheral portion of the first metal layer.

2. The LCD device of claim 1, wherein the wall is formed continuously around the pixel region.

3. The LCD device of claim 1, wherein the wall comprises an opaque material.

4. The LCD device of claim 1, further comprising third and fourth metal layers between the second metal layer and the substrate, the third and fourth metal layers each including a plurality of additional signal routing lines in the peripheral region.

5. The LCD device of claim 1, wherein a voltage potential present on the light shield portion of the second metal layer is different from a voltage potential present on the peripheral portion of the first metal layer.

6. A liquid crystal display (LCD) device having a pixel region and a peripheral region adjacent to the pixel region, comprising:
   a silicon substrate;
   a first metal layer above the substrate, and comprising
      an array of pixel electrodes in the pixel region, and
      a peripheral portion in the peripheral region;
   a second metal layer beneath the array of pixel electrodes; and
   a wall along an edge of the pixel region extending substantially between the second metal layer and the peripheral portion of the first metal layer.

7. The LCD device of claim 6, wherein the wall is formed continuously around the pixel region.

8. The LCD device of claim 6, wherein the wall comprises an opaque material.

9. The LCD device of claim 6, wherein the second metal layer comprises:
   a light shield portion in the pixel region; and
   a plurality of signal routing lines in the peripheral region.

10. The LCD device of claim 9, further comprising third and fourth metal layers between the second metal layer and the substrate, the third and fourth metal layers each including a plurality of additional signal routing lines in the peripheral region.

11. The LCD device of claim 6, further comprising third and fourth metal layers between the second metal layer and the substrate, the third and fourth metal layers each including a plurality of signal routing lines in the peripheral region.

12. A liquid crystal display (LCD) device having a pixel region and an adjacent peripheral region, the device comprising:
    a substrate; and
    a light shield comprising,
        a first metal layer including a peripheral portion in the peripheral region;
        a portion of a second metal layer in the pixel region; and
        a wall extending substantially between the first metal layer and the portion of the second metal layer in the pixel region.

13. The LCD device of claim 12, wherein the first metal layer further comprises an array of pixel electrodes in the pixel region.

14. The LCD device of claim 12, wherein the first metal layer is at a greater distance above the substrate than the second metal layer.

15. The LCD device of claim 12, wherein the second metal layer further includes a plurality of signal routing lines in the peripheral region.

16. The LCD device of claim 15, further comprising third and fourth metal layers between the second metal layer and the substrate, the third and fourth metal layers each including additional signal routing lines in the peripheral region.

17. A liquid crystal display (LCD) device having a pixel region and a peripheral region adjacent to the pixel region, comprising:
    a substrate;
    a first metal layer above the substrate, and comprising
        an array of pixel electrodes in the pixel region, and
        a peripheral portion in the peripheral region;
    a second metal layer between the first metal layer and the substrate, comprising,
        a light shield portion in the pixel region, and
        a plurality of signal routing lines in the peripheral region; and
    third and fourth metal layers between the second metal layer and the substrate, the third and fourth metal layers each including a plurality of additional signal routing lines in the peripheral region.

18. The LCD device of claim 17, wherein the third and fourth metal layers form mutually-orthogonal row and column lines for the LCD device.

19. A method of producing a liquid crystal display (LCD) device having a pixel region and a peripheral region adjacent to the pixel region, comprising:
    forming a first metal layer above a substrate;
    forming a pixel metal layer above the first metal layer, the pixel metal layer comprising an array of pixel electrodes in the pixel region, and a peripheral portion in the peripheral region; and
    forming a wall along an edge of the pixel region extending substantially between the first metal layer and the peripheral portion of the pixel metal layer.

20. The method of claim 19, wherein the wall is formed continuously around the pixel region.

21. The method of claim 19, wherein the wall is formed of an opaque material.

22. The method of claim 19, wherein forming the first metal layer comprises:
    forming a light shield portion in the pixel region; and
    forming a plurality of signal routing lines in the peripheral region.

23. The method of claim 19, wherein a plurality of vias connecting the pixel electrodes with portion of the first metal layer are formed in a same processing step as forming the wall.

* * * * *